Dec. 14, 1926.
H. A. DOUGLAS
1,610,494
TRANSMISSION MECHANISM LOCKING APPARATUS
Filed June 27, 1925   3 Sheets-Sheet 2
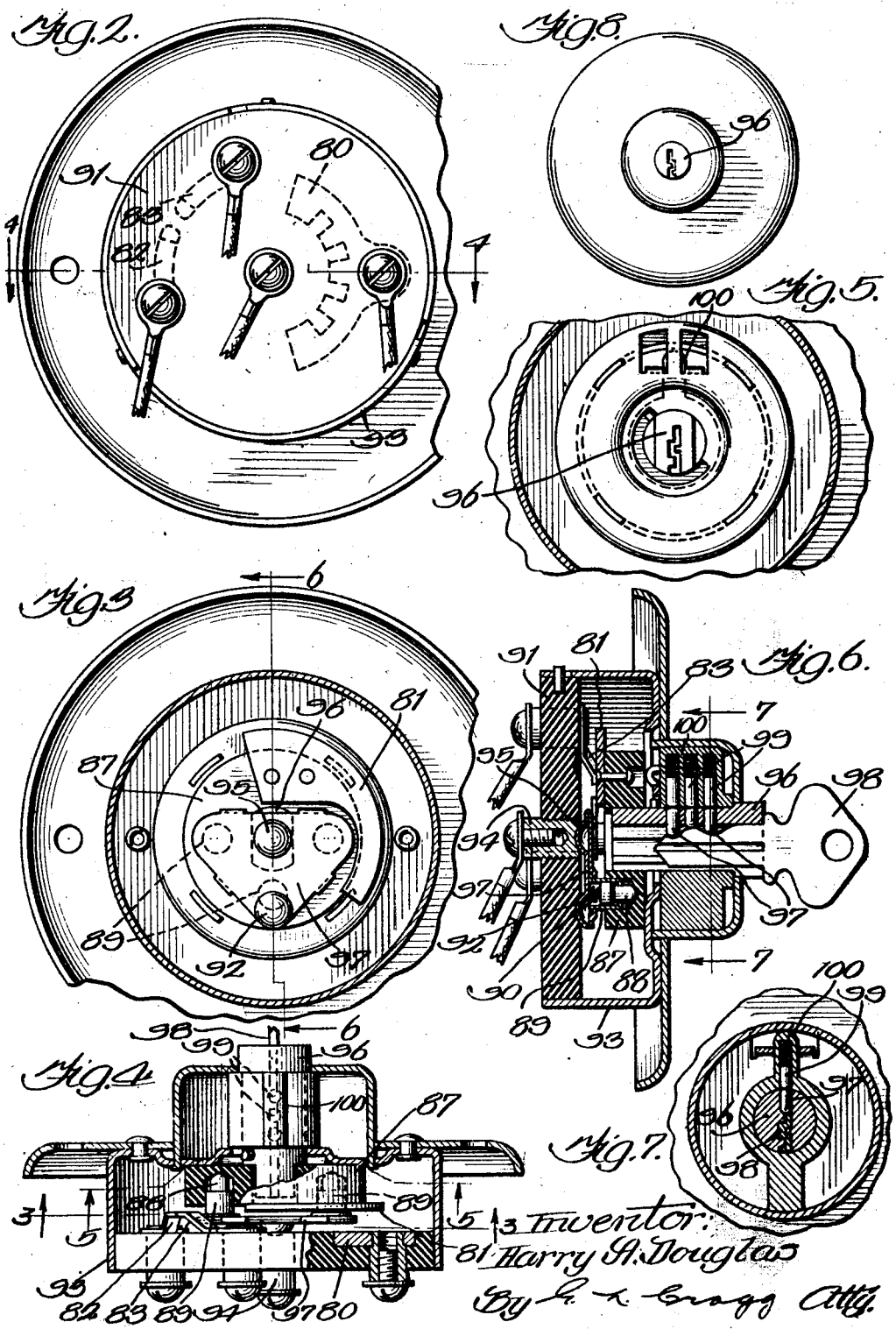

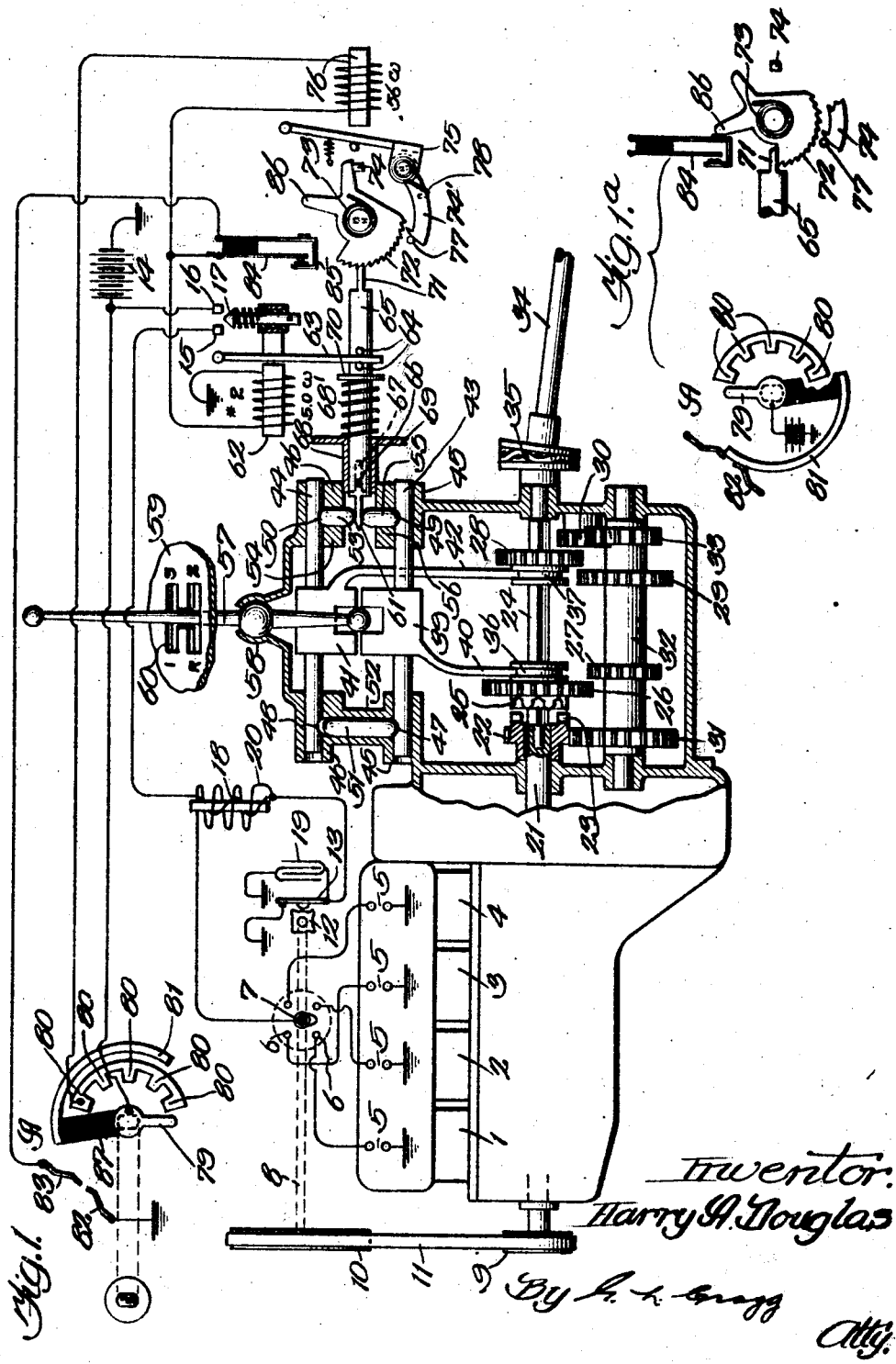

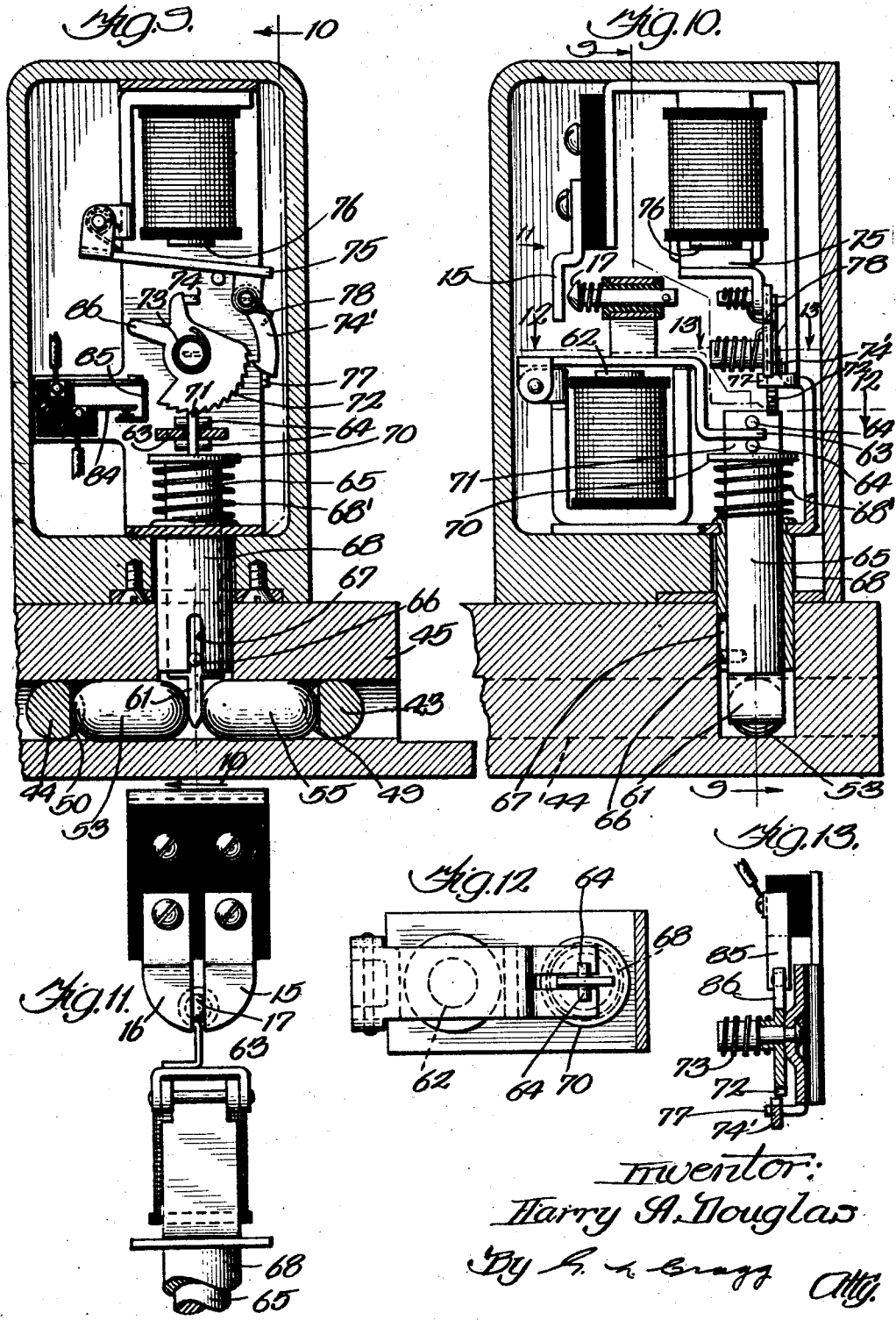

Patented Dec. 14, 1926.

1,610,494

UNITED STATES PATENT OFFICE.

HARRY A. DOUGLAS, OF BRONSON, MICHIGAN.

TRANSMISSION-MECHANISM-LOCKING APPARATUS.

Application filed June 27, 1925. Serial No. 40,079.

My invention relates to power transmission mechanism having driving and driven shafts which are separably coupled by means of complemental gears, one individual to and connected with each shaft, and one being shiftable into and out of connection with the other. My invention has for its general object the provision of means for locking the complemental gears, aforesaid, in disconnected relation, so that the two shafts may not be brought into connection by any one that is unauthorized. The apparatus of my invention is of particular utility in connection with automobiles which are driven by internal combustion hydrocarbon engines, the equipment of my invention being capable of employment to hold the transmission gears in neutral position and to prevent the unauthorized coupling thereof to guard an automobile equipped with the invention from theft. I also provide a switching device in the ignition circuit of the internal combustion engine which is employed to drive the shafts, this switching device being arranged to be held open by the mechanism pertaining to the gearing when the complemental gears are disconnected to afford additional protection against the unauthorized use of the automobile.

In the preferred embodiment of the invention the device which is employed to hold the complemental gears disconnected is itself held in functioning position by a holding device which is operable step by step to a releasing position. The number of steps required to release the step by step adjustable holding device should be unknown except to the operator of the automobile and those in confidence with him, so that a stranger seeking to acquire the use of the automobile will be uncertain as to the number of steps to be employed to release the step by step operated holding device. The mechanism for initially locking the complemental gears in disconnected relation is desirably electro-magnetic, and the device for holding the electro-magnetic mechanism in locking relation to the disconnected gears is itself also desirably released by another electro-magnet. The first electro-magnet, the locking electro-magnet, may be energized to lock the complemental gears in disconnected relation upon a single energization thereof, whereas the electro-magnet that is related to the step by step operated holding device, is intermittently energized in order that it may successively effect the step by step releasing operation of this holding device.

The invention has other characteristics and will be fully set forth in connection with the accompanying drawing in which Fig. 1 is a diagrammatic illustration of the preferred embodiment thereof as employed in connection with an automobile; Fig. 1ª is a diagrammatic view illustrating some of the parts shown in Fig. 1 in changed positions; Fig. 2 is a rear view of the switch which controls the circuits of the magnets; Fig. 3 is a sectional view of the switch on line 3—3 of Fig. 4; Fig. 4 is a sectional view on line 4—4 of Fig. 2; Fig. 5 is a sectional view on line 5—5 of Fig. 6; Fig. 6 is a sectional view on line 6—6 of Fig. 3; Fig. 7 is a sectional view on line 7—7 of Fig. 6; Fig. 8 is a face view on a smaller scale, illustrating the casing of the switch and a lock which enters into the control of the switch; Fig. 9 is a view illustrating a part of the electro-magnetic mechanism, this view being taken on line 9—9 of Fig. 10; Fig. 10 is a sectional view on line 10—10 of Fig. 9; Fig. 11 is a face view of part of the apparatus taken in the direction of the arrow 11 of Fig. 10; Fig. 12 is a sectional view on line 12—12 of Fig. 10, and Fig. 13 is a sectional view on line 13—13 of Fig. 10.

The power plant illustrated includes an internal combustion engine having four cylinders, 1, 2, 3, and 4, each cylinder having an ignition circuit inclusive of the sparking terminals 5, each included in a conductor grounded at one end and connected with a contact 6 at its other end. The four contacts 6 of the four ignition circuits are arranged in a circular row which is concentric with a revoluble switching arm 7 adapted to engage the contacts 6 in succession. The switch arm 7 is carried upon a shaft 8 which is driven by the engine through the intermediation of an engine driven pulley 9 and a pulley 10 driven by the pulley 9 through the intermediation of a belt 11. The shaft 8 also carries a circuit interrupting cam wheel 12 that serves to vibrate the circuit interrupting switch 13 which is included in an inducing ignition circuit arranged to be supplied with current from the battery or generator 14 of direct current.

This inducing circuit may be traced from the battery 14, which is grounded, through the contacts 15 and 16, when these contacts are bridged by the switch member 17, the inducing winding 18, the switch 13, to the grounded contact of this switch. The switch 13 and its contact are desirably shunted by a grounded condenser 19 in accordance with common practice. The switch 17 is in the induced circuit which may be traced from the switch 13 and its grounded contact through the induced coil 20, the switch arm 7, the particular contact button 6 which happens to be engaged by the switch arm 7 to the sparking terminals 5 pertaining to the engaged contact 6.

The pitmen or cranks of the engine directly drive the engine shaft 21 upon which there is keyed a double gear wheel having a spur pinion portion 22 and a crown pinion portion 23. A square shaft 24 has a double gear wheel slidable thereon but turning therewith, this double gear wheel including a crown pinion 25 which is complemental to the crown pinion 23 and may be connected therewith or disconnected therefrom according to the direction in which it is moved along the shaft 24. The spur gear wheel 26 which is in rigid and fixed relation to the crown gear 25, may, with said crown gear, occupy a neutral position or may be connected with a complemental gear 27 when the composite gears 25 and 26 are moved a sufficient distance from the composite gear, 22, 23. Another gear, the spur gear 28, is mounted to slide upon the shaft 24 and to turn therewith, this gear being adapted to mesh alternately with the gears 29 and 30, or to be in a neutral position out of connection with both of these latter two gears. The spur gear 22 is constantly in mesh with a spur gear 31, whereby the shaft 32 is rotated, this shaft carrying the gears 27, 29 and the gear 33 that is in driving relation with the gear 30. The shaft 24 is connected with the shaft 34 through the universal joint 35, this shaft 34 being usually in driving relation with the differential gearing that couples the two sections of the rear propelling axle or shaft of the automobile power plant. The composite gears 25 and 26 are equipped with an annularly grooved collar 36 which is coaxial therewith. A similar annularly grooved collar 37 is coaxial with the spur gear 28. A shifter 39 has a forked arm 40 which enters the groove of the collar 36. Another shifter 41 has an arm 42 which enters the groove of the collar 37. The two shifters 39 and 41 are respectively equipped with rods 43 and 44 which are located abreast and are movable in parallel directions within the parallel guides 45 and 46. The rods are formed with notches 47 and 48 at two of their adjacent ends and with notches 49 and 50 at their remaining ends. A pin 51 is disposed between the rods and is movable transversely thereof within its guide 52. A pin 53 is movable in its guide 54 transversely of the rod 44. A pin 55 is movable in its guide 56 transversely of the rod 43. The pins 53 and 55 are aligned. When the shaft 24 is disconnected from the shaft 21 it is said to be neutral, Fig. 1 illustrating this neutral adjustment which is effected by the gear shifters 41 and 39 that place the gears upon the shaft 24 in the disconnected positions illustrated. The shifters 39 and 41 are to be operated to have different relations with each other to bring about corresponding changes in the relations of the gears upon the shaft 24 to the gears complemental thereto, whereby the shaft 24 and the shaft 34 coupled therewith may not only be at rest according to the adjustment illustrated in Fig. 1, but may be driven at the first, second or third speed forward or in a reverse direction, all as is well understood by those skilled in the art. In accordance with common practice the gear shift lever 57 is common to the gear shifters 39 and 41 and is universally movable upon its ball and socket joint 58 to establish the various relationships of the gear shifters to bring about the various relationships of the different sets of complemental gears. The usual plate 59 with the ordinary H-slot 60 is illustrated for holding the lever in any of its adjustments. The lever is shown in Fig. 1 as being in its neutral position, in which event the pin 51 will not interfere with the movement of either of the rods 43 and 44 inasmuch as this pin is then in line with the notches 47 and 48, the pin being just short enough to barely clear one rod when occupying the corresponding notch in the other rod. The two aligned pins 53 and 55 that are transversely disposed between the rods are of an aggregate length that equals the length of the pin 51 so that the two pins 53 and 55 may function similarly to the pin 51 when the pins 53 and 55 are in contact at their adjacent ends. When the transmission is adjusted to neutral position the pins 53 and 55 are in line with the notches 49 and 50. If it is desired to lock the transmission so that the shaft 24 may not be driven at all or in either direction, the pins 53 and 55 are spread apart by means of a wedging spreader 61 which moves rectilineally midway between and parallel to the rods 43 and 44 and in line with the adjacent end faces of the pins 53 and 55. When these pins are spread apart by the spreader each pin enters its notch in the rod to which it is individual, assuming the gears are in neutral, the spreader holding these pins in their notches so that neither rod may be moved. When the gearing is to be released from its neutral position the spreader is withdrawn, whereupon the pins 53 and 55 permit adjustments in the manner of pin 51.

The mechanism for interposing the spreader between the pins 53 and 55 is desirably inclusive of an electro-magnet 62 preferably of 5 ohms resistance. The armature 63 of this magnet is disposed between two pins 64 that are upon the plunger 65. When the magnet is energized its armature moves the plunger 65, through the intermediation of the pins 64, to interpose the spreader 61 between the pins 53 and 55, it being assumed that the gear shifters have been adjusted to the neutral position illustrated, which is the only position in which the pins 53 and 55 permit the interposition of the spreader therebetween, it being understood from the foregoing description that when the spreader is withdrawn these two pins 53, 55 will permit the various relative adjustments of the rods and the shifters thereon. The plunger 65 is desirably prevented from turning in order that the spreading wedge 61 may be confined to a fixed plane. To this end the plunger 65 carries a pin 66 which moves within slots 67 that are formed in opposite sides of a fixed sleeve 68 which surrounds and guides the plunger 65. When the magnet 62 is de-energized a releasing device, later to be described, permits the spreader to be withdrawn, the actual withdrawal of the spreader being effected by the coiled spring 68′ which surrounds the plunger 65 and is bottomed at one end against the abutment 69 and at its other end against a flange 70 which is fixed upon the plunger.

The plunger 65 has an extension 71 at its outer end which constitutes a holding dog for maintaining the arcuate ratchet 72 in any position to which this ratchet may be adjusted, in the normal range of movement of the ratchet, the ratchet in turn, holding the dog and spreader. A spring 73 constrains the ratchet to a normal position against the stop 74, this stop being positioned according to the number of steps or tooth spaces it is desired to turn the ratchet in order to place it out of holding engagement with the dog, see Fig. 1, wherein the mechanism is adjusted to lock the transmission gearing, as has been set forth. When the transmission gearing is to be unlocked, the ratchet 72 is adjusted step by step from the position shown in Fig. 1, to the position shown in Fig. 1ª, in which the dog 71 is outwardly thrust on one side of the ratchet 72 by the spring 68′ to permit the spreader 61 to be withdrawn from its place between the pins 53 and 55.

The mechanism for operating the ratchet 72 in a dog releasing direction is desirably inclusive of an actuating pawl 74′ pivoted upon an armature 75 of an electro-magnet 76 and pressed against a guiding pin 77 by a spring 78. Each time the magnet 76 is energized the pawl 74′ moves the ratchet 72 one step or tooth space, and when the magnet has caused the ratchet to move the predetermined number of steps that are to be secretly employed in unlocking the transmission gearing, the dog 71 slips outwardly against the side of the ratchet to the position illustrated in Fig. 1ª as described.

The circuits of the magnets 62 and 76 are desirably governed by a unitary switching mechanism having a single operating handle or member controlling contacts some of which are individual to and some of which are common to, both magnets. The preferred circuit arrangement is illustrated in Fig. 1, where the switching mechanism A is shown in its final position which it reaches in causing the gearing to be locked. Fig. 1ª illustrates this switching mechanism at the conclusion of its adjusting movement in which the holding device 72 is operated step by step in a releasing direction to release the dog 71, as shown at the right of Fig. 1ª, to unlock the gearing. The movable members of the switching mechanism are moved clockwise in causing the gearing to be locked and are moved counter-clockwise in causing the gearing to be unlocked. The switching mechanism at A includes a rotatable contact member 79 adapted to sweep over the arcuate row of connected contacts 80 that are one greater in number than the number of step by step movements required to place the holding ratchet 72 in gear unlocking position. The contact member 79 is turned in a counter-clockwise direction, as viewed in Fig. 1, to move the ratchet 72 from the position shown in Fig. 1 to the position shown in Fig. 1ª. When the contact member 79 engages the lowermost contact 80 in its counter-clockwise movement the magnet 76 is not effectively energized since in this first step of the movement of the member 79 a circuit is established which may be traced from the grounded battery 14 through the member 79, the lowermost contact 80, the magnet 76, the magnet 62, to ground, the magnet 76 being, say, of .56 ohms resistance while the magnet 62 is of 5 ohms resistance, the resistance of the latter magnet preventing the first magnet from becoming effectively energized. When the contact member 79 engages each succeeding contact 80 the magnet 62 is shunted by the engagement of the arcuate contact member 81 with the contacts 82 and 83, an engagement which is effected when the contact member 79 reaches the second contact 80 and is maintained throughout the balance of the unlocking movement of the member 79. The circuit which is established when the contact member 70 is upon each contact 80 that succeeds the lowermost contact 80, may be traced from the grounded battery 14 through the switch member 79, the particular contact 80 engaged thereby, the step by step magnet 76, the contacts 84 and 85 of the switch, the contact 83, the arcuate contact 81, to the grounded contact 82. The magnet 62 is then connected in a grounded leg from this circuit and its resistance is consequently shunted from circuit with the magnet 76 so that this magnet 76 may be energized each time the circuit last traced, is closed, it being understood that this circuit is interrupted when the contact member 79 leaves one of the contacts 80 on its way to the next and when the contact member 79 is moved beyond the row of contacts 80, as indicated in Fig. 1ª.

The switch 84, 85 is provided so that any unauthorized person who energizes the magnet 76, in any way, beyond the number of times required to release the transmission gearing, will open the switch 84, 85 by means of the arm 86 upon the ratchet 72 that will move the contact 85 out of connection with the contact 84. The switch 84, 85, it will be observed, is included in a shunt of the higher resistance magnet 62, this shunt also including the contacts 81, 82, 83. When the arm 86 opens the switch 84, 85 under the circumstances set forth, this shunt about the higher resistance magnet 62 is broken, whereupon the magnet 62 is energized again to lock the transmission gearing.

As a further precaution the ignition circuit for the internal combustion engine is opened at the switch 15, 16, 17, whenever the transmission is locked. To this end the switch member 17, which is in the form of a headed spring pressed plunger, is carried by the armature 63 and in such position with respect to the contacts 15, 16 that it will engage these contacts to close the ignition circuit when the armature 63 is released and will be separated from these contacts to open the ignition circuit when the armature 63 is attracted to lock the transmission gearing.

The mechanical construction of the parts diagrammatically illustrated in Figs. 1 and 1ª, is illustrated in the remaining figures of the drawings, like parts being given similar characters of reference. The switching mechanism A is preferably of the mechanical construction shown in Figs. 2 to 7 inclusive. The switch member 81 is mounted upon a body of insulation 87 which is mechanically coupled with the triangular contact member 79 by means of the pins 88, and the barrels 89 through which these pins project into the insulating member 87 that also receives the adjacent ends of the barrels, these barrels being carried by the triangular contact member 79 so as to turn therewith. Springs 90 are housed in the barrels to press the pins 88 outwardly and also to press the contact member 79 toward the insulating switch base 91. This switch base carries the arcuate piece that is provided with the contacts 80, the contact member 79 having a contact 92 which has successive engagement with the contacts 80 as the insulating member 87 is turned. The insulating base 91 carries the binding posts by which the parts within the switch casing are connected in circuit. The terminal screw 94 is connected with the battery 14, the contact member 79 being formed with a bulging portion 95 which is received in a hollow formed upon the inner end of the screw 94, this screw being coaxial with the ring like insulating member 87. It is desirable to lock the switch members 79 and 81 in the positions to which they are adjusted when the tranmission gearing is locked, Fig. 1. To this end a lock barrel 96 is rigidly coupled with the insulating member 87 and carries tumblers 97 that are controllable by a key 98, these tumblers being in controlling relation to inwardly spring pressed tumblers 99 that are carried by the casing of the switch in a suitable housing 100 fixed with respect to this casing. When the switch mechanism is in the adjustment shown in Fig. 1, and the key 98 is withdrawn, the tumblers 99 will enter the spaces occupied by the tumblers 97 to prevent the barrel 96 from turning, and as this barrel is fixedly connected with the insulating member 87, the switch members 79 and 81 coupled with this insulating member 87, cannot be shifted from their gear locking position without insertion of the proper key in the barrel 96.

Changes may be made without departing from my invention.

Having thus described my invention, I claim:

1. The combination with two shafts; of two complemental gears, one individual to and connected with each shaft, one of these gears being shiftable into and out of connection with the other; lever mechanism in operating relation to said shiftable gear; electro-magnetic mechanism, engageable, when energized, with said lever mechanism when this lever mechanism is adjusted to place the shiftable gear out of connection with its complement, to thereby hold the shiftable gear in this adjustment; a holding device for maintaining the electro-magnetic mechanism in its gear holding adjustment and movable step by step to a releasing position; an electro-magnet for operating the holding device step by step to a releasing position; and switching mechanism for rendering the circuit of the first magnet effective and ineffective and for intermittently energizing the second magnet.

2. The combination with two shafts; of two complemental gears, one individual to and connected with each shaft, one of these gears being shiftable into and out of connection with the other; lever mechanism in operating relation to said shiftable gear; electro-magnetic mechanism, engageable, when energized, with said lever mechanism when this lever mechanism is adjusted to place the shiftable gear out of connection with its complement, to thereby hold the shiftable gear in this adjustment; switching mechanism for said electro-magnetic mechanism; and a holding device for maintaining the electro-magnetic mechanism in its gear holding adjustment and movable step by step to a releasing position.

3. The combination with two shafts; of two complemental gears, one individual to and connected with each shaft, one of these gears being shiftable into and out of connection with the other; lever mechanism in operating relation to said shiftable gear; mechanism engageable with said lever mechanism when this lever mechanism is adjusted to place the shiftable gear out of connection with its complement to thereby hold this shiftable gear in this adjustment; a holding device for maintaining the lever engaging mechanism in its holding adjustment and operable step by step to a releasing position; an electro-magnet for operating said holding device; and a switching device for intermittently energizing said electro-magnet.

4. The combination with two shafts; of two complemental gears, one individual to and connected with each shaft, one of these gears being shiftable into and out of connection with the other; lever mechanism in operating relation to said shiftable gear; electro-magnetic mechanism, engageable, when energized, with said lever mechanism when this lever mechanism is adjusted to place the shiftable gear out of connection with its complement, to thereby hold the shiftable gear in this adjustment; a holding device for maintaining the electro-magnetic mechanism in its gear holding adjustment and movable step by step to a releasing position; an electro-magnet for operating the holding device step by step to a releasing position; switching mechanism for rendering the circuit of the first magnet effective and ineffective and for intermittently energizing the second magnet; an internal combustion engine in driving relation to one of said shafts; an ignition circuit for said internal combustion engine; and a switch in the ignition circuit and governed by the mechanism that holds the complemental gears out of connection and placed thereby in circuit opening position when the complemental gears are held out of connection.

5. The combination with two shafts; of two complemental gears, one individual to and connected with each shaft, one of these gears being shiftable into and out of connection with the other; lever mechanism in operating relation to said shiftable gear; electro-magnetic mechanism, engageable, when energized, with said lever mechanism when this lever mechanism is adjusted to place the shiftable gear out of connection with its complement, to thereby hold the shiftable gear in this adjustment; switching mechanism for said electro-magnetic mechanism; a holding device for maintaining the electro-magnetic mechanism in its gear holding adjustment and movable step by step to a releasing position; an internal combustion engine in driving relation to one of said shafts; an ignition circuit for said internal combustion engine; and a switch in the ignition circuit and governed by the mechanism that holds the complemental gears out of connection and placed thereby in circuit opening position when the complemental gears are held out of connection.

6. The combination with two shafts; of two complemental gears, one individual to and connected with each shaft, one of these gears being shiftable into and out of connection with the other; lever mechanism in operating relation to said shiftable gear; mechanism engageable with said lever mechanism when this lever mechanism is adjusted to place the shiftable gear out of connection with its complement to thereby hold this shiftable gear in this adjustment; a holding device for maintaining the lever engaging mechanism in its holding adjustment and operable step by step to a releasing position; an internal combustion engine in driving relation to one of said shafts; an ignition circuit for said internal combustion engine; and a switch in the ignition circuit and governed by the mechanism that holds the complemental gears out of connection and placed thereby in circuit opening position when the complemental gears are held out of connection.

7. The combination with two shafts; of two complemental gears; one individual to and connected with each shaft, one of these gears being shiftable into and out of connection with the other; lever mechanism in operating relation to said shiftable gear; mechanism engageable with said lever mechanism when this lever mechanism is adjusted to place the shiftable gear out of connection with its complement to thereby hold this shiftable gear in this adjustment; a holding device for maintaining the lever engaging mechanism in its holding adjustment and operable step by step to a releasing position; an electro-magnet for operating said holding device; a switching device for intermittently energizing said electro-magnet; an internal combustion engine in driving relation to one of said shafts; an ignition circuit for said internal combustion engine; and a switch in the ignition circuit and governed by the mechanism that holds the complemental gears out of connection and placed thereby in circuit opening position when the complemental gears are held out of connection.

8. In combination with a sliding gear transmission including a pair of spaced, parallel, longitudinally movable gear shift rods provided on adjacent faces with stop formations; a pair of members positioned between said rods movable in a direction transversely of the latter into and out of engagement with the stop formations thereon to prevent and permit longitudinal movement of said rods, respectively, a projectable and retractable member projectable between said first mentioned members for separating them thereby to force them into engagement with the stop formations on said rods, electro-magnetic means operable when energized to project said separating member between said first mentioned members, and means independent of said electro-magnetic means acting positively following energization of said electro-magnetic means to hold said separating member in a position projected between said first mentioned members.

9. In combination with a sliding gear transmission including a pair of spaced, parallel, longitudinally movable gear shift rods provided on adjacent faces with stop formations; a pair of members positioned between said rods movable in a direction transversely of the latter into and out of engagement with the stop formations thereon to prevent and permit longitudinal movement of said rods, respectively, a projectable and retractable member projectable between said first mentioned members for separating them thereby to force them into engagement with the stop formations on said rods, electro-magnetic means operable when energized to project said separating member between said first mentioned members, means to retract said separating member from between said first mentioned members, and means independent of said electro-magnetic means acting positively following energization of said electro-magnetic means to hold said separating member in a position projected between said first mentioned members.

10. In combination with a sliding gear transmission including a pair of spaced, parallel, longitudinally movable gear shift rods provided on adjacent faces with stop formations; a pair of members positioned between said rods movable in a direction transversely of the latter into and out of engagement with the stop formations thereon to prevent and permit longitudinal movement of said rods, respectively, a projectable and retractable member projectable between said first mentioned members for separating them thereby to force them into engagement with the stop formations on said rods, electro-magnetic means operable when energized to project said separating member between said first mentioned members, spring means constantly tending to hold said separating member in a position retracted from between said first mentioned members, and means independent of said electro-magnetic means acting positively following energization of said electro-magnetic means to hold said separating member in a position projected between said first mentioned members.

11. In combination with a sliding gear transmission including a pair of spaced, parallel, longitudinally movable gear shift rods provided on adjacent faces with stop formations; a pair of members positioned between said rods movable in a direction transversely of the latter into and out of engagement with the stop formation thereon to prevent and permit longitudinal movement of said rods, respectively, a projectable and retractable member projectable between said first mentioned members for separating them thereby to force them into engagement with the stop formations on said rods, electro-magnetic means operable when energized to project said separating member between said first mentioned members, spring means constantly tending to hold said separating member in a position retracted from between said first mentioned members, means independent of said electro-magnetic means acting positively following energization of said electro-magnetic means to hold said separating member in a position projected between said first mentioned members, and electro-magnetic means operable when energized to release said holding means.

12. In combination with a sliding gear transmission including a pair of spaced, parallel, longitudinally movable gear shaft rods provided on adjacent faces with stop formations; a pair of members positioned between said rods movable in a direction transversely of the latter into and out of engagement with the stop formations thereon to prevent and permit longitudinal movement of said rods, respectively, a projectable and retractable member projectable between said first mentioned members for separating them thereby to force them into engagement with the stop formations on said rods, electro-magnetic means operable when energized to project said separating member between said first mentioned members, spring means constantly tending to hold said separating member in a position retracted from between said first mentioned members, means independent of said electro-magnetic means acting positively following energization of said electro-magnetic means to hold said separating member in a position projected between said first mentioned members, and electro-magnetic means operable when energized to release said holding means, said holding means being movable step by step to a position in which it releases said separating means, and means for intermittently energizing said last mentioned electro-magnetic means to effect a step-by-step release movement of said holding means.

13. In combination with a sliding gear transmission including a pair of spaced, parallel, longitudinally movable gear shift rods provided on adjacent faces with stop formations; a pair of members positioned between said rods movable in a direction transversely of the latter into and out of engagement with the stop formations thereon to prevent and permit longitudinal movement of said rods, respectively, a projectable and retractable member projectable between said first mentioned members for separating them thereby to force them into engagement with the stop formations on said rods, electro-magnetic means operable when energized to project said separating member between said first mentioned members, spring means constantly tending to hold said separating member in a position retracted from between said first mentioned members, means including a ratchet spring urged into engagement with said separating member to hold the latter in a position projected between said first mentioned members following energization of said electro-magnetic means, and an electro-magnetically operated pawl for moving said ratchet step by step to a position in which it releases said separating member.

14. In combination with a sliding gear transmission including a pair of spaced, parallel, longitudinally movable gear shift rods provided on adjacent faces with stop formations; a pair of members positioned between said rods movable in a direction transversely of the latter into and out of engagement with the stop formations thereon to prevent and permit longitudinal movement of said rods, respectively, a projectable and retractable member projectable between said first mentioned members for separating them thereby to force them into engagement with the stop formations on said rods, electro-magnetic means operable when energized to project said separating member between said first mentioned members, spring means constantly tending to hold said separating member in a position retracted from between said first mentioned members, means including a ratchet spring urged into engagement with said separating member to hold the latter in a position projected between said first mentioned members following energization of said electro-magnetic means, and an electro-magnetically operated pawl for moving said ratchet step by step to a position in which it releases said separating member, said separating member being arranged to serve as a dog for holding said ratchet during the intervals between its intermittent movements.

In witness whereof, I hereunto subscribe my name.

HARRY A. DOUGLAS.